US008402098B2

(12) United States Patent
Dircz

(10) Patent No.: US 8,402,098 B2
(45) Date of Patent: Mar. 19, 2013

(54) SYSTEM AND METHOD FOR INTELLIGENCE GATHERING AND ANALYSIS

(76) Inventor: Clark C. Dircz, Bloomington, MN (US)

( * ) Notice: Subject to any disclaimer, the term of this patent is extended or adjusted under 35 U.S.C. 154(b) by 815 days.

(21) Appl. No.: 12/540,972

(22) Filed: Aug. 13, 2009

(65) Prior Publication Data

US 2011/0040724 A1 Feb. 17, 2011

(51) Int. Cl.
*G06F 15/173* (2006.01)
*G06F 15/16* (2006.01)
*G06F 13/30* (2006.01)
*G06F 3/01* (2006.01)

(52) U.S. Cl. ........ 709/206; 709/231; 709/217; 709/224; 707/603; 707/606; 715/736

(58) Field of Classification Search .................. 709/203, 709/206, 224–228, 231, 200, 217
See application file for complete search history.

(56) References Cited

U.S. PATENT DOCUMENTS

| 7,769,806 | B2 * | 8/2010 | Van Wie et al. | ............... 709/203 |
| 7,844,724 | B2 * | 11/2010 | Van Wie et al. | ............... 709/231 |
| 2008/0168135 | A1 * | 7/2008 | Redlich et al. | ............... 709/204 |
| 2009/0113053 | A1 * | 4/2009 | Van Wie et al. | ............... 709/226 |
| 2009/0113066 | A1 * | 4/2009 | Van Wie et al. | ............... 709/231 |
| 2009/0254572 | A1 * | 10/2009 | Redlich et al. | .................. 707/10 |
| 2010/0010968 | A1 * | 1/2010 | Redlich et al. | ..................... 707/3 |

* cited by examiner

*Primary Examiner* — Jude Jean Gilles
(74) *Attorney, Agent, or Firm* — Merchant & Gould P.C.

(57) ABSTRACT

A computing system for intelligence gathering and analysis includes a computer-based remote avatar rendering and maintenance module, a self-directed data gathering and communication module, a remote personalized data stream analysis module, and a database. The avatar rendering and maintenance module provides an indicator for users to select targeted data streams presented as weapon icons that includes user-selected analysis priorities and threshold attributes of the targeted data. The self-directed data gathering and communication module provides administration programs that coordinate and control the timing and execution of commercially available web search, crawler, and messaging applications. The personalized data stream analysis module provides administration programs that coordinate and control the timing and execution of data consolidation, workflow and scoring programs related to the analysis module. The database stores and manages electronic data related to administrative control of all other system applications and to hold all user gathered data and analysis records as defined specific to the system requirements.

20 Claims, 10 Drawing Sheets

SYSTEM AND METHOD FOR INTELLIGENCE GATHERING AND ANALYSIS

TECHNICAL FIELD

The present disclosure is directed to systems and methods for intelligence gathering and analysis. In particular, the present disclosure is directed to a system and method of self-directed remote data gathering, storage and analysis via interactive computer-controlled data transmission.

BACKGROUND

For individually meaningful data gathering and analysis, a special computer-based system is required to filter massive amounts of electronic data, then prioritize, rank and communicate to the individual in a consolidated electronic form actionable information based on metrics established and dynamically controllable by the individual. Due to the complexity of electronic data communications, data storage limitations, the explosion of internet-based data accumulation sources and the complexity of analyzing massive amounts of information, establishing and maintaining individually useful data intelligence requires deep technical computer skills, is very expensive and extremely time-consuming. Because of these issues, only large organizations with extensive technical staffs, expensive computer equipment and software systems can produce consolidated data analysis, generally referred to as "Business Intelligence," with results almost exclusively controlled for the benefit of the organization itself. Such systems cannot be maintained or controlled by non-technical end-users and do not assimilate web-based data sources used by individuals that fall outside the organization's boundaries. Furthermore, there are currently no centralized systems available where the user chooses which data and for what purpose this data should be analyzed, such as business, military or personal analysis.

For these and other reasons, improvements are desirable.

SUMMARY

In accordance with the present disclosure, the above and other problems are solved by the following:

In one aspect, a computing system for intelligence gathering and analysis is disclosed. The system includes a computer-based remote avatar rendering and maintenance module configured to provide an indicator for users to select targeted data streams presented as weapon icons that includes user-selected analysis priorities and threshold attributes of the targeted data. The system further includes a computer-based remote self-directed data gathering and communication module configured to provide administration programs that coordinate and control timing and execution of commercially available web search, crawler, and messaging applications. The system additionally includes a computer-based remote personalized data stream analysis module configured to provide administration programs that coordinate and control timing and execution of data consolidation, workflow and scoring programs related to the analysis module. The system further includes a database configured to store and manage electronic data related to administrative control of all other system applications and to hold all user gathered data and analysis records as defined specific to the system requirements.

In another aspect, a method of intelligence gathering and analysis is disclosed. The method includes instantiating, on a remote computer, an avatar rendering and maintenance module configured to provide an indicator for users to select targeted data streams presented as weapon icons that includes user-selected analysis priorities and threshold attributes of the targeted data. The method further includes instantiating, on the remote computer, a self-directed data gathering and communication module configured to provide administration programs that coordinate and control timing and execution of commercially available web search, crawler, and messaging applications. The method additionally includes instantiating, on the remote computer, a personalized data stream analysis module configured to provide administration programs that coordinate and control timing and execution of data consolidation, workflow and scoring programs related to the analysis module. The method further includes configuring a database to store and manage electronic data related to administrative control of all other system applications and to hold all user gathered data and analysis records as defined specific to the system requirements.

In yet another aspect, a method for self-directed filtered electronic data gathering and automated delivery and presentation of analytical data to users via interaction with a computer generated avatar, wherein said data is contained in a computer database that holds gathered data as augmented by a trend analysis computer program is disclosed. The method includes instantiating a plurality of remote computer-based applications comprising an avatar maintenance module, a data gathering module, a data scoring engine module, a data storage module, and a data interaction module, wherein the avatar maintenance module comprises an avatar graphical report program, an avatar builder program, a weapon selection program, a communicator select program, and a watcher install program. The method additionally includes receiving a communication from a user initiated web browser session at a remote front-end web server via a local computer device executing a browser. The method further includes prompting the user via the watcher install program to create a login with a user-id and password, wherein a local status watcher communication application is downloaded and installed via a secure internet communication session. The method further includes saving user account information and executing the avatar builder program to present the user with choices to select avatar graphical attributes via a second browser session. The method additionally includes receiving from the user a selection of weapons monitoring targets and preferred communication modes, and receiving selection of an activate button within the avatar builder interface to run the avatar activate program that sends an electronic message containing the user-id and a status code to a battle application, wherein the battle application schedules gatherers comprising at least one data source query tools that begins collecting data on behalf of the user.

DETAILED DESCRIPTION

Figure 1:
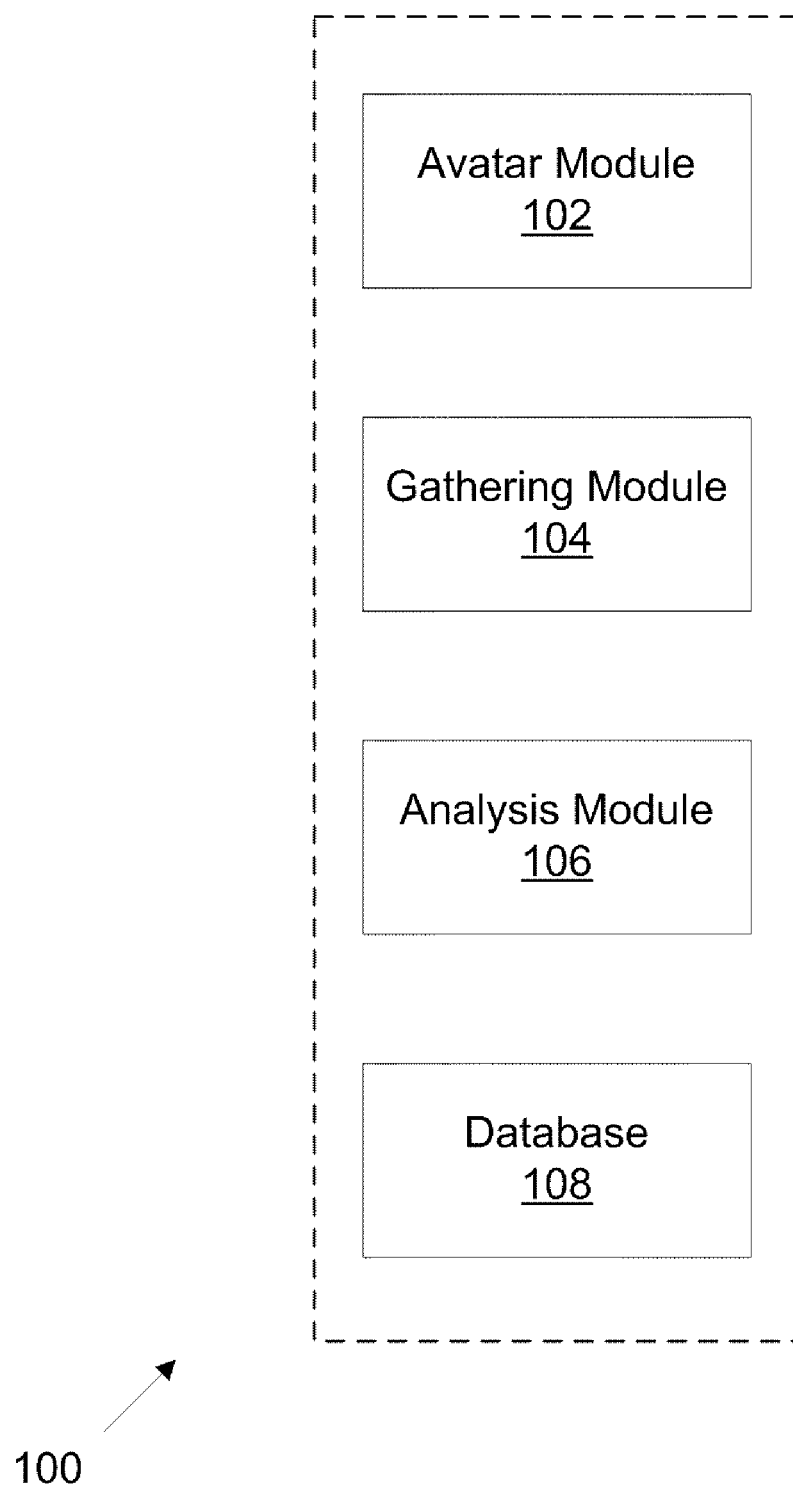
FIG. 1 is a block diagram of a system and method for self-directed remote data gathering, in accordance with one example embodiment of the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure consists of at least one remote computing base system that runs gathering, storage, analysis, communication and visual avatar programs. These programs provide interaction, personalized maintenance and personal analysis services to one or more computer users who use the internet or corporate intranet to connect to the base system via a range of computer devices such as personal computers or mobile phones.

Currently, there are no systems available to help individuals gather filtered, personally meaningful electronic information, easily assess trends within that information and alert the user to take action on those trends. To this end, the present disclosure can be directed at any electronic information source and enables anyone with access to a computer device to establish their own trend assessment and alert goals, regardless of industry affiliation or task assessment type. Moreover, users may work for themselves, the same organization or completely different organizations.

In example embodiments, the system includes a pre-structured computer database, web site, electronic communications programs, and computerized data gathering and search programs all housed on remote server computers, collectively referred to as a "Base" system. A new user accesses the Base web site by entering the site's internet address using a normal web browser session. At the site, the new user clicks on an account creation icon that redirects the user to an Account creation web page requesting at least a user email address and password and that is secured by SSL or other commercially available computer security routines. The information entered during a successful account creation session is stored as part of that user's unique profile, which also includes an encrypted identification key. During the account creation process, the Base system runs a series of utility programs, "Application A," that asks the user to download and install an optional small communication program, the "Watcher," on their local computer device. The Watcher is represented on the user's local device by a small colored icon and once installed, the program runs continuously in the background to determine whether the local device can connect to the remote base system by using the device's internet connection. If the connection to the Base exists, the icon changes color (e.g., yellow) and if the Base has information to communicate to the user, the Base periodically sends an electronic signal to the local user device that causes the icon to change to another color (e.g., green), providing the user with a visual alert. If the user does not choose to install the Watcher, communication from the Base system is sent to the user via their email account or other similar communication program already installed on their computer device.

After the Watcher or other communication link is established, the Base server starts an avatar "Builder" computer sub-routine program within Application A. The Builder program presents the user with a web page that requires the user to construct a personalized animated web-based avatar by first selecting an avatar shell that consists of any computer generated figure. When a shell is selected, the program submits a data transmission request to the Base system database to retrieve a group of analysis and intelligence services that are then presented to the end user as visual "Weapon" icons, where each icon represents summarized analytic data that is created by an inference Engine computer program. The selected service Weapons each have a user-selectable importance attribute represented by a power-level gauge or other similar computer symbol and these avatar Weapons and power attributes are stored as computer data by user in a personalization profile held in a remote computer database.

Next, the user selects from a group of communication services that are presented as visual computer icons. These include email, instant messaging, phone or any other commercially available electronic communication method where the user has a previously established account. These communication selections are also stored by user in the personalized computer database. After all avatar selections are stored, the user is presented with a graphical representation of their avatar on their computer device showing the selected weapon and communication icons attached to the avatar. The user is then prompted with a choice to save their choices and "activate" the avatar by pushing an on-screen icon. Once the user has saved their avatar attributes, the user can return to the Builder program to alter any of these avatar attributes.

When activated, computer Application (A) sends a data transmission to another Base system computer Application (B), the "Battle" gatherer application, containing the user's ID. A receiver program (B1) within the Battle application receives the user's ID and passes this parameter to a data interaction program (B2), which in turn retrieves the user's personalized weapon and communication selections in electronic data format and stores the selections in a job queue table within the computer database. Program B2 continuously runs two surrogate computer programs (external B3 and internal B4) on behalf of all system users using the data stored in the job queue table.

The two surrogate programs create individual user sessions to gather electronic information based on the user's selected Weapon list. These sessions pass parameters to commercially available outbound internet search crawlers, incoming RSS feeds and inbound search crawlers directed at internal data sources that are directly accessible to the end-user, such as corporate email systems and databases to continuously collect user-requested information. The gatherers periodically store the collected information in a computer database, the "Warehouse," identified by job, user ID and time/date stamp. The surrogates are needed to run pass security and login parameters to these gatherers to grant them access to certain sites and data sources.

A third web-service based computer program, Program (C), the intelligence inference "Engine," periodically reads through all new data returned by the gatherers contained in Program B, groups it by Weapon category and assigns a multi-factor mathematical score for each new group of data, along with a date/time stamp. The Engine also periodically calculates another mathematical score based on the net change in the sets of scores measured between date periods. The two sets of calculations comprise the intelligence inference algorithm and are called the "Velocity." When the Velocity varies from the Weapon power attribute selected by the user during avatar maintenance by a percentage or other mathematical variance factor set by a system administrator, Program C triggers a computer communication program running on the remote base system.

This communication program creates an electronic message for the user that includes each Weapon and related Velocity along with a text warning message. To transmit the message, the Base system uses another computer program continuously running in the background controlled by the battle Program (B), called the "Messenger" service. This Messenger program alerts the user that the Battle Program B has information that needs the user's attention by sending the user the specially coded electronic message text transmission to all the user's previously selected electronic communication methods that are stored in the user's avatar profile. The user's local Watcher monitors the devices electronic communication stream for the special message and changes color on the local device's visual toolbar icon when alerted.

When the user clicks the Watcher icon on their local device or other related electronic message sent to the user, the Watcher program opens a browser session on the local device that in turn connects to the remote Base computer servers running Program A. The connection process instructs a program on that site to graphically render the user's avatar and weapon icons within the browser session and present them to the user within the browser page. The user then clicks on the avatar's Weapon icons to open another browser session running on Application B that retrieves that user's current Velocity results as computed by the Engine, and presents them in a graphical fashion along with imbedded icon links. The user can click on the icons to drill through and display any of the underlying transactions to see the computer data captured by the Battle/gatherer programs.

At any time, the user can terminate the communication session by closing the browser window or selecting a log-off function.

Referring now to the Figures, FIG. 1 illustrates a system 100 for intelligence gathering and analysis. In example embodiments, the system 100 includes an avatar module 102, a gathering module 104, an analysis module 106, and a database 108. The avatar module 102 is a computer-based remote avatar rendering and maintenance module that provides an indicator for users to select targeted data streams presented as weapon icons that includes user-selected analysis priorities and threshold attributes of the targeted data. The gathering module 104 is a computer-based remote self-directed data gathering and communication module that provides administration programs that coordinate and control the timing and execution of commercially available web search, crawler, and messaging applications. The analysis module 106 is a computer-based remote personalized data stream analysis module that provides administration programs that coordinate and control the timing and execution of data consolidation, workflow and scoring programs related to the analysis module. The database 108 stores and manages electronic data related to administrative control of all other system applications and to hold all user gathered data and analysis records as defined specific to the system requirements.

Figure 2:
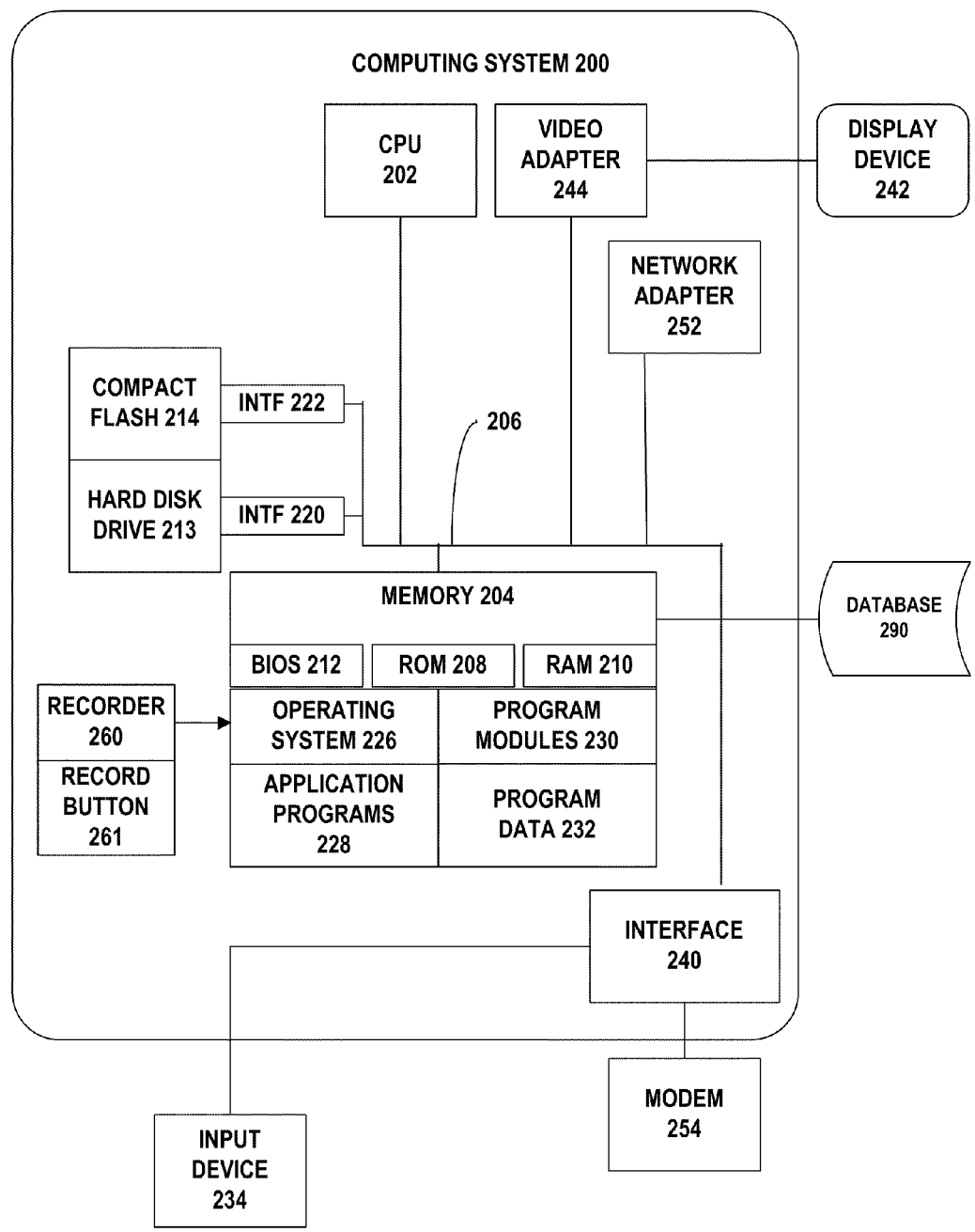
FIG. 2 is an exemplary embodiment of a schematic representation of a computing system that may be used to implement aspects of the present disclosure.

FIG. 2 and the following discussion are intended to provide a brief, general description of a suitable computing environment in which the invention might be implemented. Although not required, aspects of the present disclosure are described in terms of computer-executable instructions, such as program modules, being executed by a computing system. Generally, program modules include routines, programs, objects, components, data structures, etc., that perform particular tasks or implement particular abstract data types.

Those skilled in the art will appreciate that aspects of the present disclosure might be practiced with other computer system configurations, including handheld devices, palm devices, multiprocessor systems, microprocessor-based or programmable consumer electronics, network personal computers, minicomputers, mainframe computers, and the like. Aspects of the present disclosure might also be practiced in distributed computing environments where tasks are performed by remote processing devices that are linked through a communications network. In a distributed computing environment, program modules might be located in both local and remote memory storage devices.

Referring now to FIG. 2, an exemplary environment for implementing embodiments of the present disclosure includes a general purpose computing device in the form of a computing system 200, including at least one processing system 202. A variety of processing units are available from a variety of manufacturers, for example, Intel or Advanced Micro Devices. The computing system 200 also includes a system memory 204, and a system bus 206 that couples various system components including the system memory 204 to the processing unit 202. The system bus 206 might be any of several types of bus structures including a memory bus, or memory controller; a peripheral bus; and a local bus using any of a variety of bus architectures.

In example embodiments, the system memory 204 includes read only memory (ROM) 208 and random access memory (RAM) 210. A basic input/output system 212 (BIOS), containing the basic routines that help transfer information between elements within the computing system 200, such as during start-up, is typically stored in the ROM 208.

In example embodiments, the computing system 200 further includes a secondary storage device 213, such as a hard disk drive, for reading from and writing to a hard disk (not shown), and/or a compact flash card 214.

The hard disk drive 213 and compact flash card 214 are connected to the system bus 206 by a hard disk drive interface 220 and a compact flash card interface 222, respectively. The drives and cards and their associated computer-readable media provide nonvolatile storage of computer readable instructions, data structures, program modules and other data for the computing system 200.

Although the example computing system 200 described herein employs a hard disk drive 213 and a compact flash card 214, it should be appreciated by those skilled in the art that other types of computer-readable media, capable of storing data, can be used. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk drive 213, compact flash card 214, ROM 208, or RAM 210, including an operating system 226, one or more application programs 228, other program modules 230, and program data 232. A user may enter commands and information into the computing system 200 through an input device 234. Examples of input devices might include a keyboard, mouse, microphone, joystick, game pad, satellite dish, scanner, digital camera, touch screen, and a telephone. These and other input devices are often connected to the processing unit 202 through an interface 240 that is coupled to the system bus 206. These input devices also might be connected by any number of interfaces, such as a parallel port, serial port, game port, or a universal serial bus (USB). A display device 242, such as a monitor or touch screen LCD panel, is also connected to the system bus 206 via an interface, such as a video adapter 244. The display device 242 might be internal or external. In addition to the display device 242, computing systems, in general, typically include other peripheral devices (not shown), such as speakers, printers, and palm devices.

When used in a LAN networking environment, the computing system 200 is connected to the local network through a network interface or adapter 252. When used in a WAN networking environment, such as the internet, the computing system 200 typically includes a modem 254 or other means, such as a direct connection, for establishing communications over the wide area network. The modem 254, which can be internal or external, is connected to the system bus 206 via the interface 240. In a networked environment, program modules depicted relative to the computing system 200, or portions thereof, may be stored in a remote memory storage device. It will be appreciated that the network connections shown are exemplary and other means of establishing a communications link between the computing systems may be used.

The computing system 200 might also include a recorder 260 connected to the system memory 204. The recorder 260 includes a microphone for receiving sound input and is in communication with the system memory 204 for buffering and storing the sound input. In example embodiments, the recorder 260 also includes a record button 261 for activating the microphone and communicating the sound input to the system memory 204.

A computing device, such as computing system 200, typically includes at least some form of computer-readable media. Computer readable media can be any available media that can be accessed by the computing system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
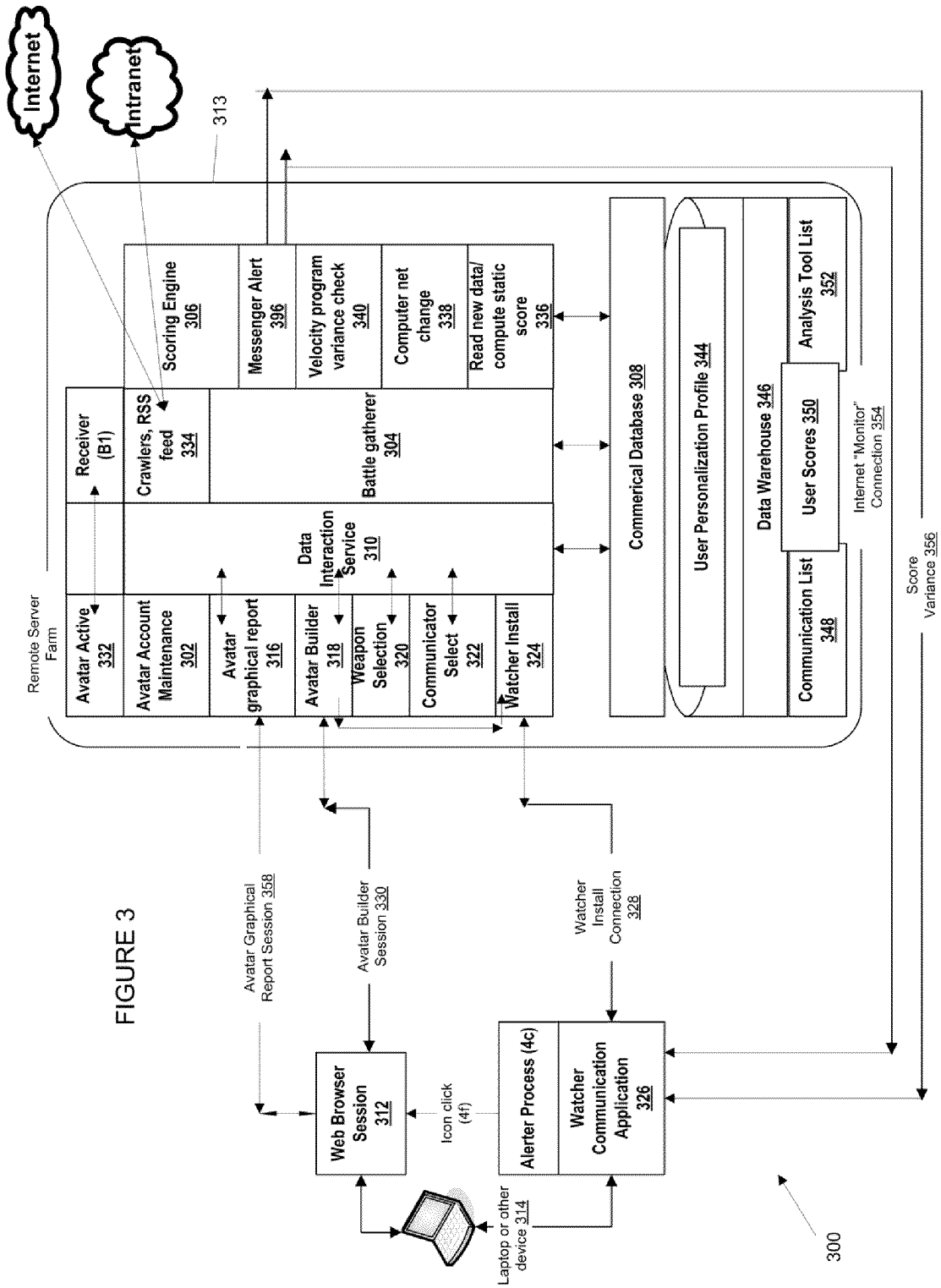
FIG. 3 is a block diagram of a system and method for self-directed remote data gathering, storage and analysis via interactive computer-controlled data transmission maintained though a graphical computer avatar interface, in accordance with one example embodiment of the present disclosure.

Referring now to FIG. 3, an example embodiment of a system 300 for self-directed filtered electronic data gathering and automated delivery and presentation of analytical data to users via interaction with a computer generated avatar where such data is contained in a computer database that holds the gathered data as augmented by a trend analysis computer program is shown.

In example embodiments, these functions are delivered via a plurality of primary remote computer server-based applications or modules: avatar maintenance 302, data gathering ("battle" gatherer) 304, data scoring engine 306, data storage 308, and data interaction 310. These applications in turn are comprised of computer modules that control other computer modules as well as commercially available third-party electronic data storage, gathering and communication systems. In example embodiments, the avatar maintenance 302 includes an avatar graphical report program 316, an avatar builder program, 318, a weapon selection program 320, a communicator select program 322, and a watcher install program 324.

Users initiate web browser sessions 312 that connect over the internet or intranet to a remote front-end commercial web server 313 via any computer device 314 capable of running an internet browser.

After a user makes the first connection to the remote avatar maintenance application 302, the watcher install program 324 asks the user to create a login with user-id and password and then download and install a local status watcher communication application 326 via a secure internet communication session 328. If the user cannot install the watcher for any reason, the user can still create and save their account information on the remote system. On successful account save, the avatar maintenance application 302 runs the avatar builder program 318, which presents the user with choices to select avatar graphical attributes via a second browser session 330. Next, the user selects monitoring targets, called "Weapons", from a pre-determined list of data sources by running the weapon selection program 320, followed by a similar selection of their preferred communication modes by running the communication selection program 322.

All data for the application is stored in the commercial database server application 308 with input/output to the system applications handled via a data interaction program written as a web service 310. Once all avatar-required data has been entered for a given user, the user pushes an "Activate" button within the avatar builder interface to run the avatar activate program 332, which sends an electronic message to the battle application 304 containing the user-id and status code. At that point the battle application 304 schedules the gatherers 334, consisting of commercially available web crawlers, RSS data feeds and other data source query tools identified by the users weapons, to begin collecting data on behalf of the user. Simultaneously and continuously, the data scoring engine 306 loops through the gathered battle data, identifies which data is new, groups the data by weapon and applies the velocity static scoring 336 and net change 338 algorithms, both defined in this disclosure, to the data, with the resulting score and change records written back to tables in the database 308.

By means of a velocity variance check program 340 running continuously in the data scoring engine 306, the system compares the static and trend scores to the user-entered values established for each weapon. When the resulting comparison falls beyond a mathematical range expressed by the "power" attribute for each user's chosen weapons, the variance check program 340 sends an electronic message to the messenger alert program 342, consisting of user-id, weapon and a predetermined alert body. This messenger alert program 342 transmits one or more electronic data streams to the user's local Watcher 326 and to a commercial communication server capable of delivering the message in the formats and modes selected by the user during the avatar communicator selector 322, such as Microsoft Exchange Server®.

Figure 4:
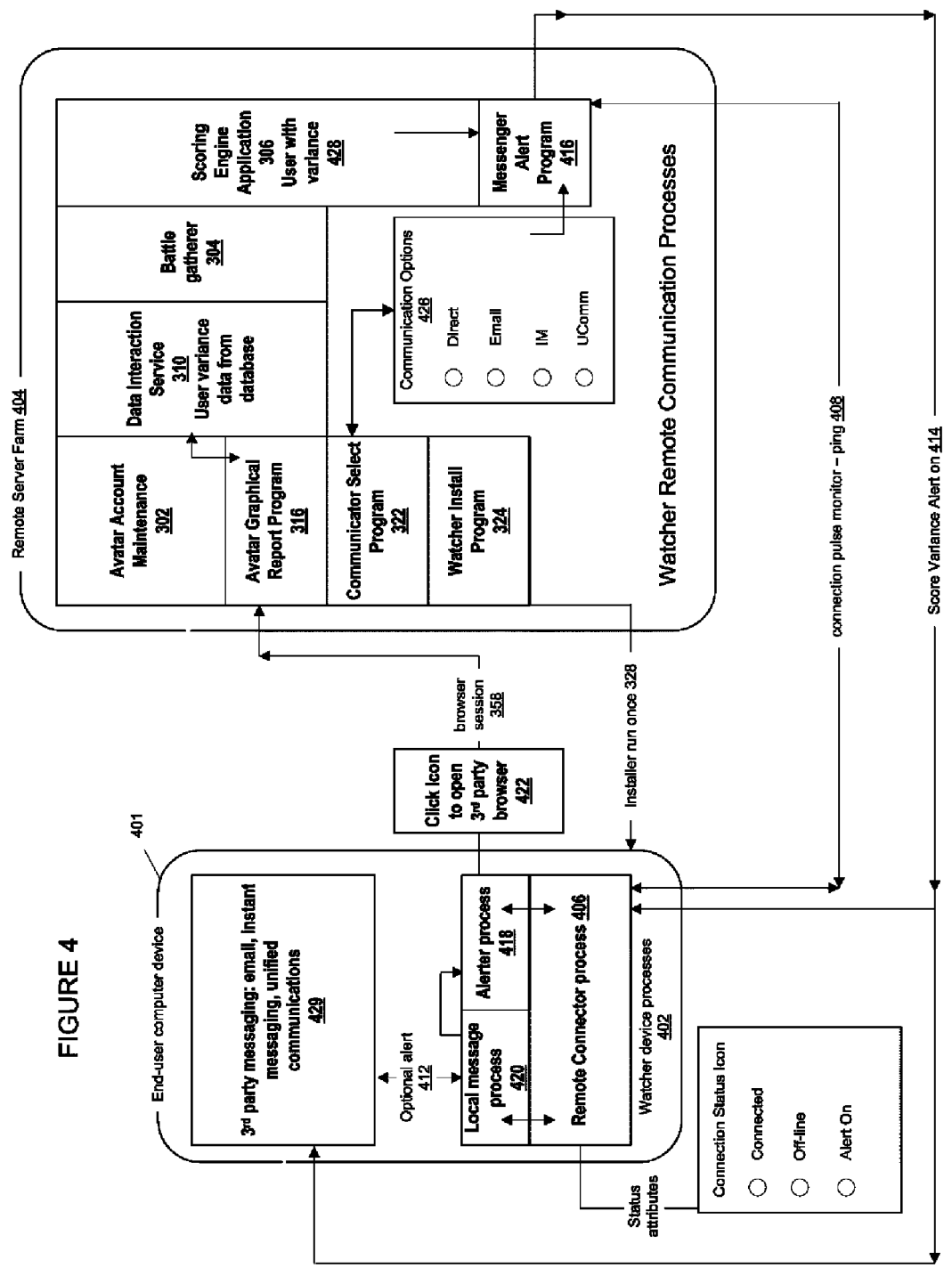
FIG. 4 is a block diagram of the basic structure of a communication link program installed on an end-user computer device that communicates with a remote computerized gathering, storage and analysis system, in accordance with one example embodiment of the present disclosure.

FIG. 4 shows an example embodiment of the basic structure of the watcher communication system 326 of FIG. 3, used for active user-notification and will be described in greater detail here. In example embodiments, the term "active notification" refers to electronic data interchange between the local end-user device (401) and the remote avatar account maintenance 302 and data scoring engine 306 without the necessity for the end-user to periodically manually sign in and check for alerts and messages from the remote system. As noted earlier, during the initial user account setup, the avatar maintenance application 302 runs a program that allows the user to download and install a local component of watcher communication system 326.

This local component 326 consists of several computer programs, or modules, running within a single computer application, collectively called the watcher device processes 402 and includes a toolbar status icon. During the initial installation session 328, the watcher install program 324 transmits an encrypted key identifier for the IP address, the user-id and the internet protocol port of the remote server farm 404, which is stored on the local device. A remote connector process 406 runs an internet ping or other simple pulse-monitor command 408 back to a listener program running as part of Messenger Alert 410. This program notes the incoming connection attempt and responds with an electronic message in 2 possible states; connected or alerted.

Upon receipt of this message, the local remote connector process 406 flips the visual attribute of the toolbar connection status icon based on the message into one of three colors. In general, the colors can vary, however, in the example embodiment, the colors are set by an administrator to green for connected, red for alert on and yellow for off-line-which indicates that the pulse monitor communication failed. Accordingly, when connected to the internet or other network the user can quickly see whether further action is needed. If the status is alerted, the messenger alert program 410 transmits the electronic message via all other communication methods the user selected at avatar setup time 414 and 416. Upon receipt of this message a local alerter process 418 also enables a browser attribute within the local toolbar icon such that when the icon is clicked, the local device opens a web browser session back to the remote system 358.

When alerted, the local watcher device may optionally run a local message process 420 to send alert messages 412 to the user's other locally installed communications programs. These messages will include direct connection information sufficient to launch a browser session directly back to the remote system. So, regardless of how the method user responds to these alerts, the watcher device processes 402 launch a browser session 358 and connect the user back to the remote avatar graphical report program 316 to access the report content. Once the user makes this connection and accesses the reporting function, the local device status icon is set back to green to indicate normal connected status. Note in the current disclosure, the local watcher device processes 402 may be implemented by a stand-alone program or as an add-on program to other local communication monitors such as the Microsoft Office Communicator® client.

Figure 5:
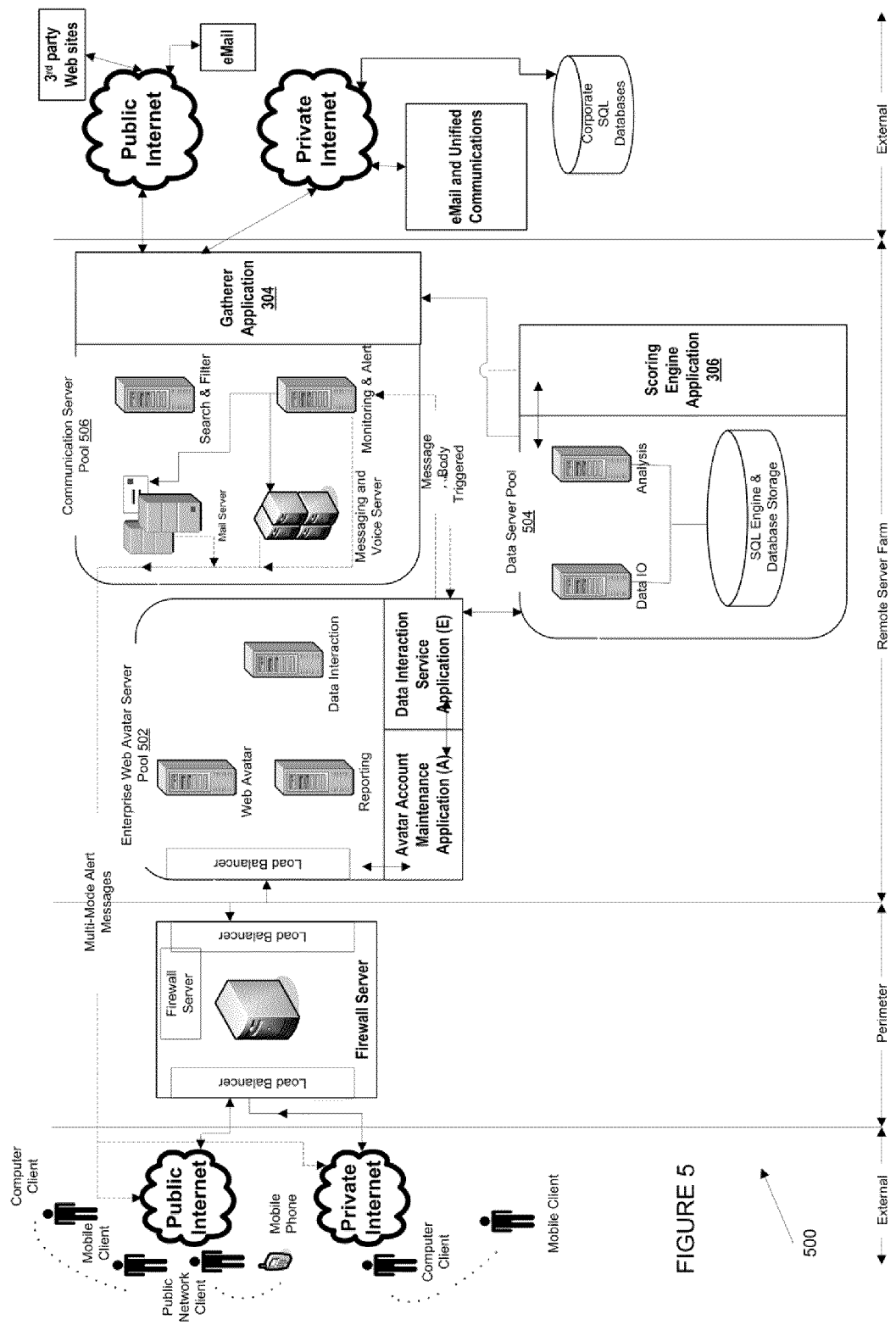
FIG. 5 is a basic structure of a remote computer-server based interaction, data gathering, storage and analysis system, in accordance with one example embodiment of the present disclosure.

FIG. 5 shows an example embodiment of a high-level layout for remote components of a computer server-based interaction, storage and analysis system 500. Because the volume of users and data in the system described herein can be very high and the system utilizes many commercial computer-based applications and servers in unique combinations, a high-level physical layout of the entire system 500 is included here.

These remote components are organized into physical application server pools 502, 504, 506, which are enhanced with commercial load balancers and firewalls for scalability and security. Likewise, commercial operating systems, SQL databases, web crawlers and communication servers are used to ensure compatibility with computer-industry standards and promote access to the maximum number of data sources through the maximum number of physical computer devices. This structure is adapted to the special tasks of providing self-directed intelligence gathering, interacting with users via a virtual avatar interface and analyzing the gathered data through the application of static and trend assessment algorithms running as computer programs. While a commercially available virtual avatar rendering engine can be used to present an interactive graphical object to a web-browser user, as noted, the avatar application portion of the system uses special communication and data targeting attributes to provide inputs to all the other applications. Similarly, the special programs described herein to enable avatar-based control, data passing, reporting and presentation of the unique data compiled constitute a special adaptation of all noted components. Furthermore, a data interaction service is another part that enables asynchronous electronic data exchange between the disparate commercial applications running across multiple server farms 502, 504, 506.

Figure 6:
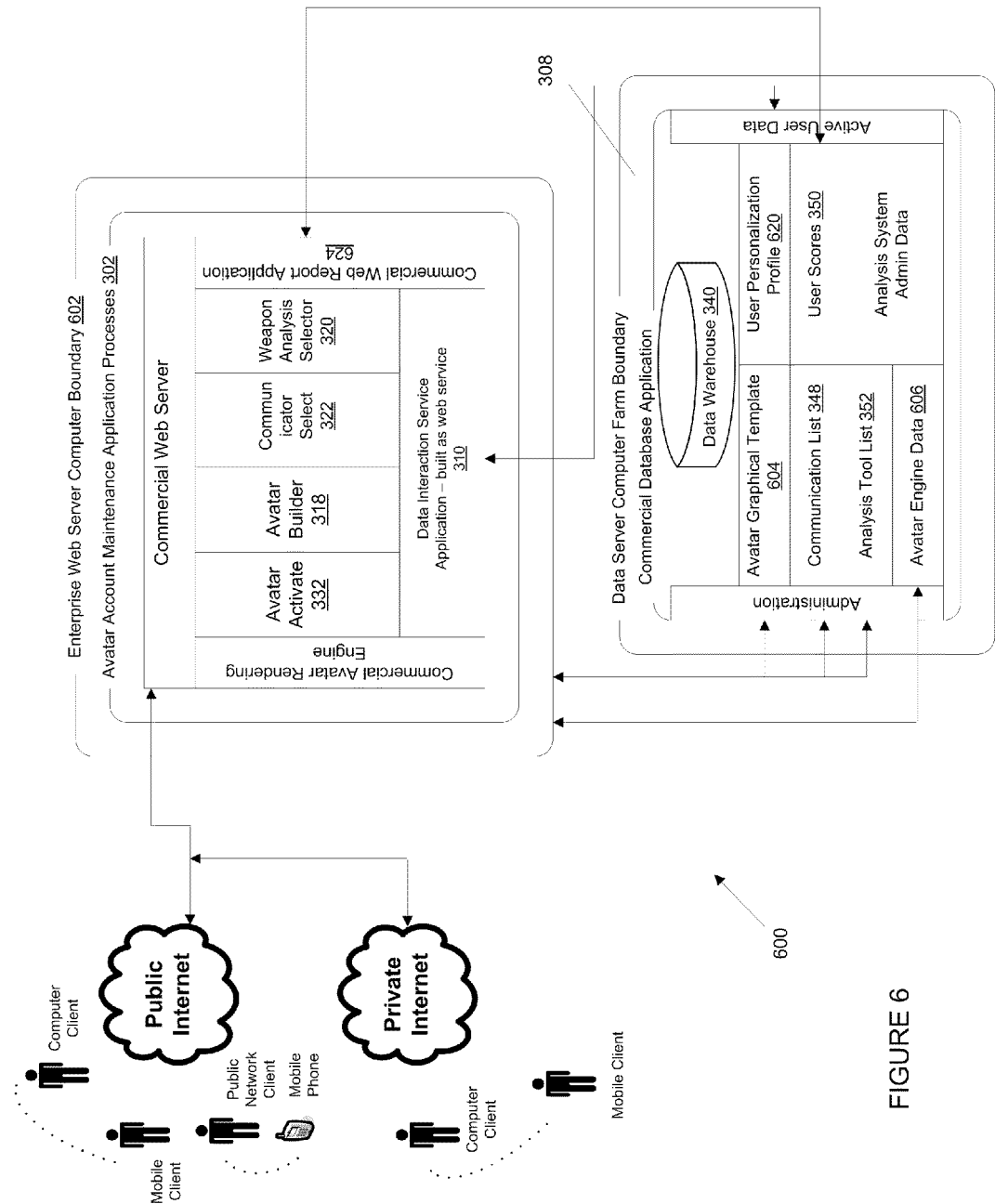
FIG. 6 is a basic structure of a computer-server based interaction system that communicates with end-users in the form of a media-enabled graphical avatar, in accordance with one example embodiment of the present disclosure.

Referring now to FIG. 6, several aspects of a data interaction service and graphical computer avatar communication sub-system 600 are detailed according to the principles of the present disclosure. As noted previously, the actual graphical avatar rendering can be performed by several commercially available computer avatar rendering engines such as those used in computer-based video games. When an end user uses their local computing device to connect to the remote system over the internet or an intranet, the user is first connected to a commercial web server 602, which has been adapted to store and read the avatar rendering properties 604, 606 from a commercial database server 308. In addition to these visualization properties, an avatar builder program 318 adaptation adds communication 322 and analysis tool 320 ("weapon") lists to the data set, such items being maintained by an administrator via coded web pages added to the rendering engine administrative interface. These lists 320, 322 are presented to the user as an additional adaption of the avatar rendering interface such that the user can select values from the lists and store their selections back to database as part of their user personalization profile 620. Because of the potential for large numbers of users and massive amounts of stored data, the avatar account maintenance applications 302 and the commercial database application 308 will exist in separate remote computer server farms.

To manage data input and output between these farms, a data interaction service application 310 is necessary to provide centralized controlled data interchange between all the applications. Another adaptation of the avatar rendering interface is the formulation of a reporting graphic object attached to the avatar image that when clicked activates a commercial data reporting application 624 that has been modified to retrieve user score information 350 from the database 340 and present this information in the form of computerized charts and graphics that are built into the reporting application.

As noted previously, another function of the present disclosure is to gather filtered electronic data from internet and intranet sources as directed by each user.

Figure 7:
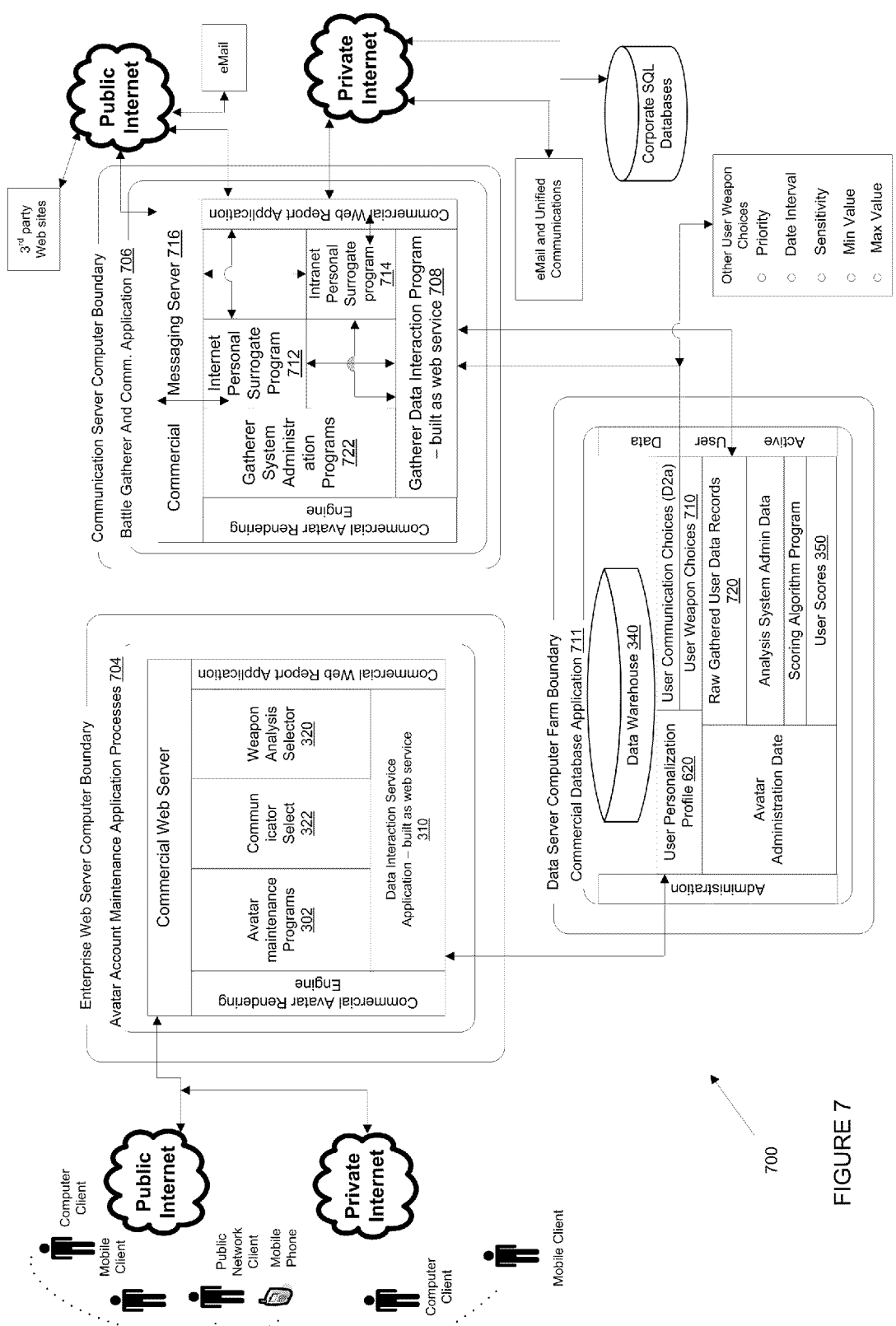
FIG. 7 is a basic structure of a computer-server based self-directed data gathering and storage system, in accordance with one example embodiment of the present disclosure.

FIG. 7 shows details of a self-directed computer data gathering and storage sub-system 700, comprising both unique adaptations of commercially available computerized systems and newly created programs. After a user has built a user personalization profile 702 via an avatar account maintenance application 704 and activated the user, the "Battle" gatherer and storage application 706 begins gathering data for the user. The Battle application 706 continuously runs a computer data interaction program 708. One of the functions of this program 708 is a looping routine that reads through all user-ids and status records within the user personalization profile 702 to find all users with a status of Active. For these users, the interaction program 708 will retrieve the user's data target Weapons and related connection attributes such as password and login ID's, web URL, Destination, Priority, Date Interval, Sensitivity, Minimum Value, Maximum Value from the user weapon choice table 710 within the database 711.

The data interaction program 708 then passes this electronic data to one of two surrogate programs 712, 714 based on a Weapon destination attribute of internet 712 or Intranet 714. As unique embodiments, these surrogate programs are needed to pass credentials and filter criteria to the commercial application 716, 718 that find and review the targeted data. The Intranet personal surrogate program 714 starts a computer session for all Weapon targets whose destination attribute is "internal", indicating that the information source is part of the user's privately protected computer domains behind deep computer firewalls, such as internal corporate web sites, private email servers and private corporate databases. In this case, the surrogate program 714 must be able to securely handle logging into those private sources to access the data. For targeted data that resides on searchable locations on the internet, the internet personal surrogate program 712 starts and manages the user sessions.

In both cases, the surrogates 712, 714 pass sufficient attributes to commercial web crawler/search applications 718 and messaging servers 716 to enable those applications to gather, filter and run summary routines on the desired information. An adaptation of the normal commercial search and messaging applications allows the surrogate programs 712, 714 to receive the data from the commercial applications in electronic format and automatically pass the data back to the surrogates 712, 714 rather than only storing the data natively in those commercial applications own databases. This step is necessary because of the realization that individual users do not have the time or ability to monitor, parse, filter, consolidate, prioritize or summarize the volumes of data present in the targeted data sources. The surrogate programs 712, 714 filter the data returned by each Weapon according to the priority, date interval, minimum, maximum and other criteria as specified in the user weapon choice 710. A computer routine within these programs sorts the data by Weapon and then creates a single, summarized, consolidated data record for the data retrieved in the particular session for each Weapon. These new records constitute Raw Gathered User Data Records 720 and are passed back to a Gatherer Data Interaction Program 722 for storage in the Database 711.

Next, the Raw Data Records are further processed within a Scoring Engine Application to yield trend analysis and inferred intelligence value.

Figure 8:
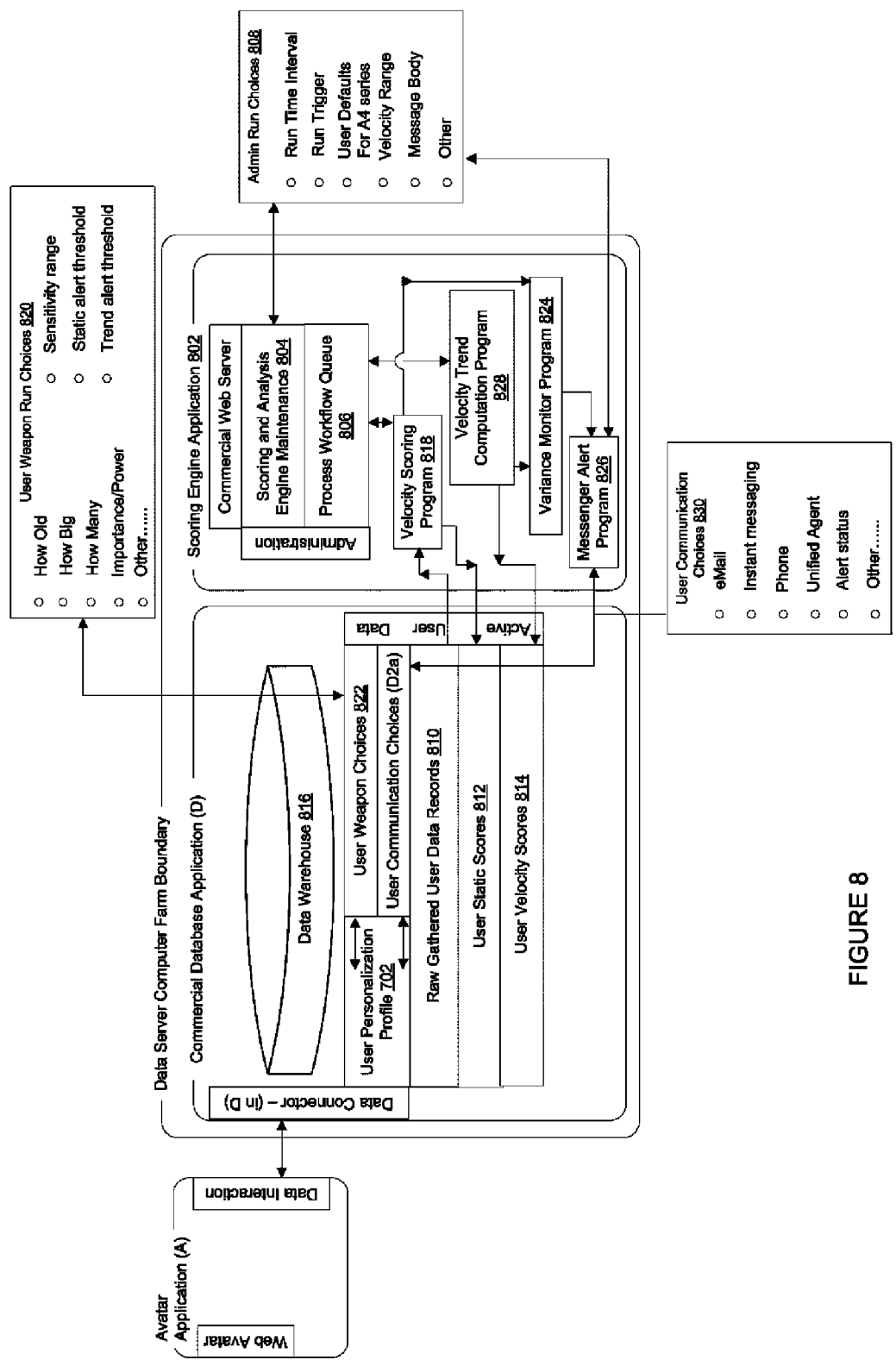
FIG. 8 is a basic structure of a computer-based data analysis program which utilizes an algorithm to apply statistical formulas to grouped streams of electronic data, in accordance with one example embodiment of the present disclosure.
Figure 9:
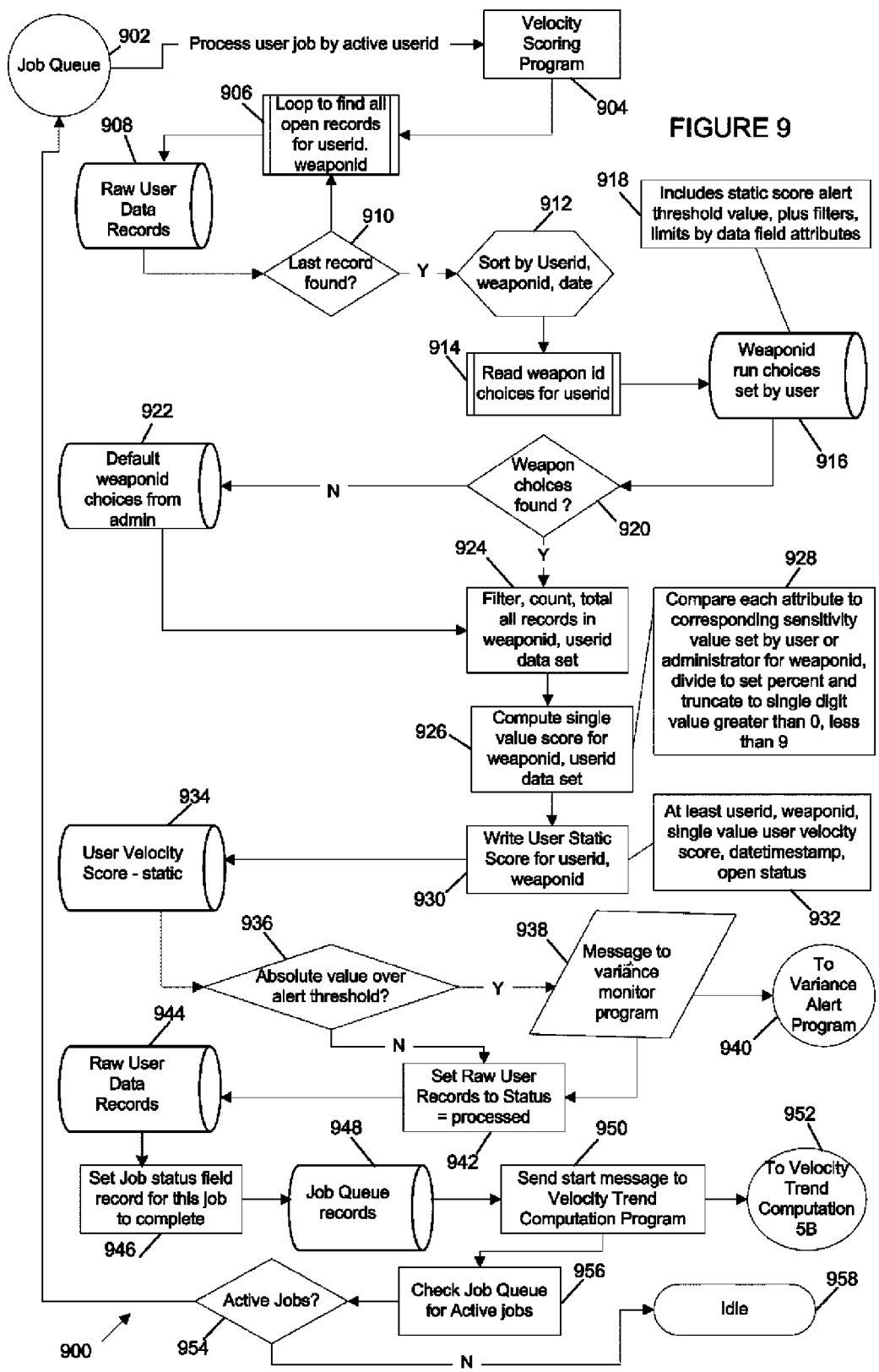
FIG. 9 is a schematic representation of a process sequence for self-directed remote data gathering, storage and analysis, in accordance with one example embodiment of the present disclosure.
Figure 10:
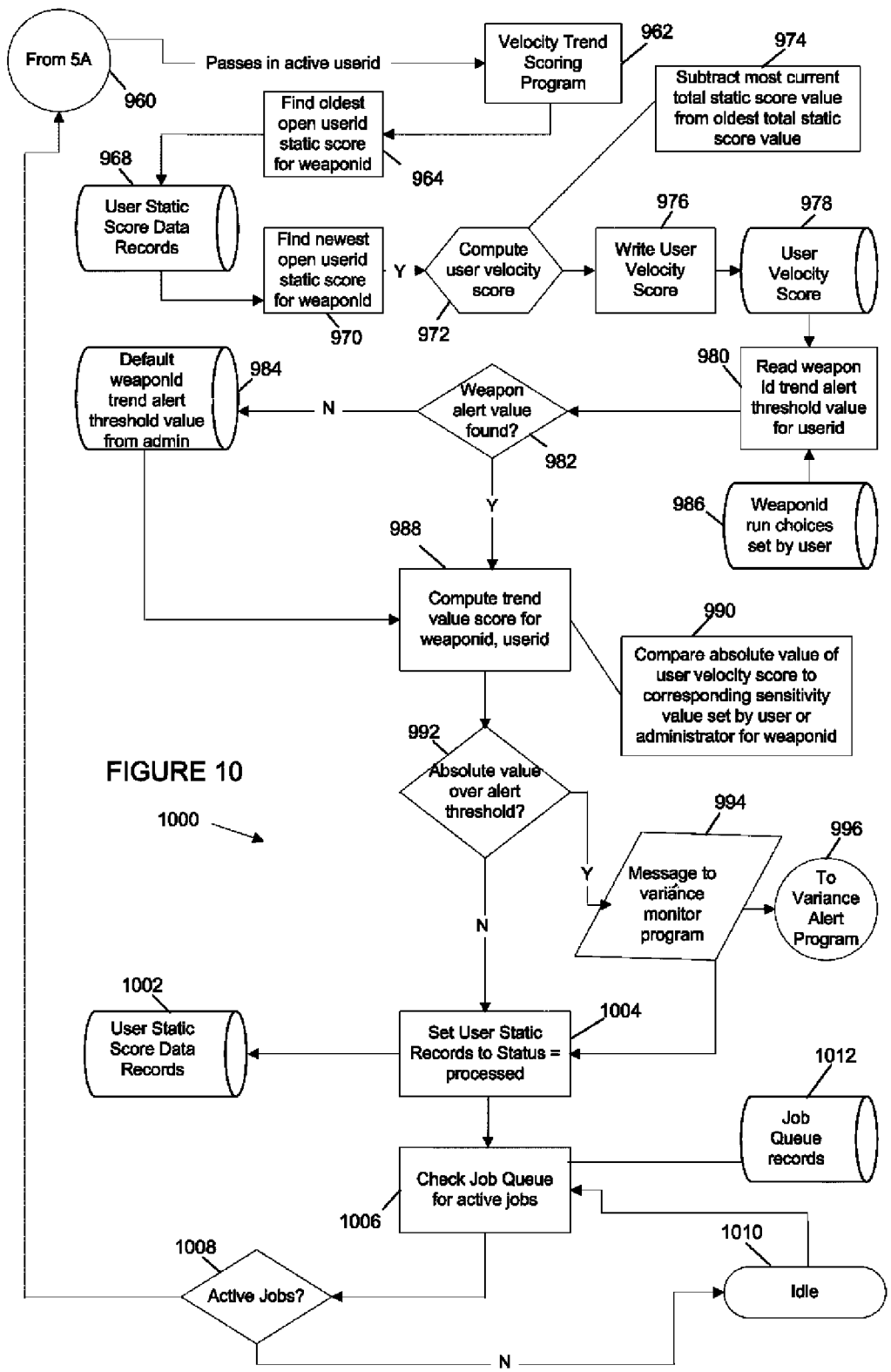
FIG. 10 is a continuation of the schematic representation of a process sequence for self-directed remote data gathering, storage and analysis of FIG. 9, in accordance with one example embodiment of the present disclosure.

FIG. 8 is a schematic representation of the basic structure of a computer-based program and algorithm 800 for personalized trend analysis and intelligence value inference of data streams that constitute unique components contained within a scoring engine application 802. FIGS. 9 and 10 provide one example embodiment of detailed program logic flows 900, 1000 for the scoring engine application 802. However, other embodiments are possible as well. This scoring engine 802 consists of several computer programs that provide administration, computations, monitoring and messaging functions.

A scoring and analysis engine maintenance program 804 provide administrative access to values that control the operation of the other programs and is accessed through web forms hosted on a commercial web server such as Microsoft IIS®. Attributes managed through this program include Run Time Interval, Run trigger, User Defaults for Weapon and Communication choices, Velocity Ranges (as described in further detail below), Message bodies for structuring automated communications and other values that may be needed to control a scoring application 802. One embodiment of the overall system contemplates continuous operation of the scoring engine across multiple computer servers, via continuous execution of a process workflow queue program 806.

This program 806 uses run time interval and run trigger attributes 808 to determine how often to schedule the other programs that make up the scoring engine 802. Particularly, the workflow program 806 can be set to run the other programs upon the firing of database triggers established within the data stored in the raw records 810, user static scores 812 and user velocity scores 814 held in the database 816. For example, a count of unprocessed raw records 810 in excess of 500 could trigger the scoring engine 802 to run. Another embodiment of the system contemplates running the scoring engine 802 at pre-set time internals specified in the run time interval parameter 808, such as every 2 minutes. In either case, when the workflow queue program 806 is executed, that program 806 uses the active user-id contained within the body of the raw records 810 to construct a set of active job records for that user in a job tracking table that is part of the workflow queue program 806.

Simultaneously the queue program 806 transmits an electronic message to the velocity scoring program 818 telling that program 818 to process that user's jobs (e.g., step 902 of FIG. 9). Next, the scoring program 818 finds all unprocessed raw user data records 810 (e.g., steps 904, 906, 908, and 910 of FIG. 9) for a given queued job record as indicated by a processing status attribute field in the records, and sorts them by user data source "Weapon" and date order (e.g., step 912 of FIG. 9). The scoring program 818 further looks up that User's "Weapon" Run Choices 820 that were previously selected by the user and stored as electronic data 822 in the database 816 (e.g., steps 914, 916, and 918 of FIG. 9). These choices include attributes such as numeric thresholds for values contained in each record, how many records to count, which dates are valid, importance ranking and other attributes that may be established by the user for each Weapon type. Next, the program evaluates if "Weapon Choices Found?" for a given user are not found (e.g., step 920 of FIG. 9), the system uses defaults values specified by a system administrator to insure that the process runs (e.g., step 922 of FIG. 9).

For example, the user may have chosen a Weapon type of "Analyze Competitors Web News," where the battle application 304 (see FIG. 3) has retrieved abstracted information from targeted web sites on the internet based on filtering criteria set up by the user (e.g., step 924 of FIG. 9). The velocity scoring program 818 applies the user's attribute filters to find all instances of gathered records where the retrieved web page is less than 30 days old where the page contains text references to "Competitor X", "Sales", and "$500,000." Furthermore, in this example the battle application 304 may have identified 10 records that met this criteria. The velocity scoring program 818 would then write a single user static scoring record 812 back to the database 816 with identifier values such as the user-id, datetime stamp, and attribute values of count (10 in this case), document date, totalAmount (say 5,000,000 in this case), age (say 30, based on the number of days older the document-date is than the datetimestamp date), CompetitorX, velocitytrendstatus flag="open" and so on.

Another function in the scoring program 818 then computes a single value score for the record based on comparison of each attribute value to the corresponding sensitivity value 822 the user established for that attribute during Weapon setup (e.g., step 926 of FIG. 9). This function is based on the insight that reducing complex data sets measured at a point in time to a simple, consistent mathematical value record simplifies significance assessment and provides a base for more consistent data trend analysis. For example, one embodiment allows the users to choose a numerical sensitivity maximum value of 50 for count, 100 for age and 10,000,000 for total amount for the Weapon type "Analyze Competitors Web News."

Further, one aspect contemplates calculating a single numerical score for each attribute by calculating the percentage difference of the actual attribute from the maximum sensitivity value and truncating the resulting percentage to a single number that must be between 1 and 9 (e.g., step 928 of FIG. 9). In the case of the example data of date of 30 divided by the sensitivity of 100 or 30 percent, truncated leaves a value of 3. Similarly, the TotalValue factor becomes 5 (5,000,000/10,000,000 truncated to 5), while the Count factor becomes 2 (10/50 truncated to 2). These values are then combined into a single value score of 352, which is written back to the user static score table 812, with user-id, weapon-id, timedatestamp and score value (e.g., steps 930, 932 and 934 of FIG. 9).

Next, the velocity scoring program 818 looks up the user's Static Alert Threshold value from the user weapon choice table 822 for that weapon (e.g., step 936 of FIG. 9). If the absolute value of the single score value is greater than or equal to the Static Threshold Alert value, the program sends an electronic alert message to the variance monitor program 824 passing user-id, static score and other attributes of the alert condition along with instructions for that program to send an alert message to the user via the messenger alert program 826 (e.g., steps 938 and 940 of FIG. 9).

After completing this static scoring process, the scoring program 818 updates the processing status attribute field in the raw user data records 810 to indicate that they are "complete" to ensure that they are only processed once, followed by updating a similar field in the process workflow queue job record 806 to indicate that the first score for that job is complete (e.g., steps 942, 944, and 946 of FIG. 9). This process is repeated until all queued scoring jobs for all users are completed. Because of the potential for many users and Weapon targets, one embodiment of the system contemplates that the workflow queue 806 and velocity scoring program 818 will run continuously across multiple servers running under the flow logic as noted in FIG. 9 where the programs run a sub-process called "Check Job Queue for Active Records" (e.g., steps 954 and 956 of FIG. 9). Over time, the application will accumulate a large number of these static scores. For our example, 60 days later the system creates a user static score for the given weapon with a value of 575.

As each velocity scoring queued job is completed, the velocity scoring program 818 sends an electronic start signal to the velocity trend computation program 828 (e.g., steps 950 and 952 of FIG. 9). This notification simply tells program 828 to start running (e.g., step 962 of FIG. 10). After notification, program 828 finds the oldest (by date) user static score record 812 with status="open" and reads the user-id, weapon-id, attribute scores, static score and datetimestamp values (e.g., step 964 of FIG. 10). Next, the trend program 828 reads through the same user static score table 812, finds the most current (by date) "open" record with the same user-id and weapon value and reads the attribute values (Count, TotalAmount, etc.) and static score from that record (e.g., steps 968 and 970 of FIG. 10 which verifies that at least the oldest and newest records exist). Continuing the example from the preceding paragraph (where the updated weapon value is 575), the oldest record has the value of 352, while the most current record has a value of 575.

Another function within the trend computation program 828 computes a numeric net change by subtracting the static score of the most current static record from the static score of the oldest prior record, yielding a positive or negative number, the user velocity score 814 for that user's weapon (e.g., steps 972 and 974 of FIG. 10). This function writes a record back to the user velocity score table 814 consisting of at least the user-id, weapon-id, datetimestamp and user_velocity_score (e.g., steps 976 and 978 of FIG. 10). Again continuing the example of the preceding two paragraphs, this computation would result in a user_velocity_score of (352−575), or −225.

Next, the velocity scoring program 818 looks up the user's Trend Alert Threshold value from the user weapon choice table 822 for that weapon, where if the user has established a Threshold Alert value, the value will be read from the database (e.g., steps 980 and 986 of FIG. 10). If there is no stored value for that user, the program retrieves a default Threshold Alert value as established by a system administrator (e.g., step 984 of FIG. 10). For the example of the preceding paragraphs (and for purposes of illustration only), the Threshold Alert value can be set to 200.

Once a Threshold Alert value is selected, if the absolute value of the velocity score is greater than or equal to the Threshold Alert value, the program 818 sends an electronic alert message to the variance monitor program 824 passing user-id, velocity score and other attributes of the alert condition along with instructions for that program to send an alert message to the user via the messenger alert program 826 (e.g., steps 992, 994, and 996 of FIG. 10). Continuing the preceding example, because the absolute value of the velocity score (225) is greater than or equal to the Threshold Alert value (200), the program 818 sends an electronic alert message to the variance monitor program. The velocity scoring program 818 then updates the status of the oldest processed record to "complete" or similar designation. The same program goes on to "Set User Static Records to Status=processed" for the newest static, which leaves that record to potentially become the oldest record in that set during the next job run (e.g., steps 1002 and 1004 of FIG. 10). The velocity trend computation program 828 processes are repeated until all queued trend scoring jobs for all users are completed (e.g., steps 1006, 1008, 1010, and 1012 of FIG. 10). Because of the potential for many users and Weapon targets, one embodiment of the system contemplates that the velocity trend computation program 828 will run continuously.

For conditions where either the velocity scoring program 818 or velocity trend computation program 828 have identified an alert condition and caused the variance monitor program 824 to send a message via the messenger alert program 826, an embodiment can use the following processing methods and functions. The messenger alert program 826 will connect to the user communication choices table 830 within the database 816 and read the user's communication choices (email etc.) by referencing the user-id.

Next, the messenger alert program 826 reads the admin run choice 808 message body attributes for any alerted Weapons in electronic format, and merges the specific attributes passed to this program from the variance monitor program 824 as noted previously into the message body to create an electronic message suitable for transmission via any commercial email or other similar communication server. Once merged, the messenger alert program 826 sends the composed message body to all of that user's chosen communication destinations. The messenger alert program 826 also updates an alert status flag field in the user's communication choice record to "alert=on".

As noted previously, each end user local computer device may optionally run a "Watcher" component that periodically connects to the remote system via a score variance alert monitor similar to an internet session connect or ping and checks the alert status. If the Watcher detects a status of "alert=on", the Watcher flips a colored icon on the user's local device task bar to red or some other color to visually indicate the alert. The combination of the concurrently sent messages and the watcher score alert constitute an active notification device and method to ensure virtually immediate end-user awareness of alert conditions based on the information targeting and filtered sensitivity that they have personally established and directed, enhanced by the Computer-Based Velocity Programs and Algorithms, all of which constitute novel deliverables of the present disclosure.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A computing system for intelligence gathering and analysis, the system comprising:
   a processing unit;
   a memory communicatively connected to the processing unit and configured to store computer-executable instructions comprising a plurality of modules, the modules including:
     a avatar rendering and maintenance module configured to provide an indicator for users to select targeted data streams presented as weapon icons that includes user-selected analysis priorities and threshold attributes of the targeted data;
     a self-directed data gathering and communication module configured to provide administration programs that coordinate and control timing and execution of commercially available web search, crawler, and messaging applications; and
     a personalized data stream analysis module configured to provide administration programs that coordinate and control timing and execution of data consolidation, workflow and scoring programs related to the analysis module; and
   wherein the computing system further includes a database configured to store and manage electronic data related to administrative control of all other system applications and to hold all user gathered data and analysis records as defined specific to the system requirements.

2. The computing system of claim 1, wherein the avatar rendering and maintenance module is further configured to:
   specify electronic communication interfaces presented as tool icons;
   install an active watcher monitoring component on a plurality of local user devices; and
   enable web-service based data interaction.

3. The computing system of claim 2, wherein the avatar rendering and maintenance module is further configured to create a visual interface within a web browser to enable users to individually choose and store, by user-id in the database, data gathering targets in the form of computer-generated graphical weapon icons and personal communication services in the form of computer-generated graphical communication device icon.

4. The computing system of claim 2, wherein the watcher monitoring component is further configured to monitor a status field stored in a remote database table via a series of periodic interactive computer communications.

5. The computing system of claim 4, wherein communications received by the watcher contain information that notifies a user to review information held by the remote avatar rendering and maintenance module.

6. The computing system of claim 1, wherein the data gathering and communication module is further configured to:
   provide personal electronic surrogates that enable the search, crawling and messaging applications to gain secure access to targeted sources that require specific user credentials;
   enable continuous multi-server operation of battle applications; and
   enable web-service based data interaction with other applications of the system.

7. The computing system of claim 6, wherein the data gathering and communication module is further configured to listen for an electronic activation command containing a user-id, a time-date-stamp, and an active-status value from an avatar activation program.

8. The computing system of claim 6, wherein the data gathering and communication is further configured to transmit one or more electronic communications selected from the group consisting of weapon data retrieval targets, user-ids and passwords to a personal surrogate program.

9. The computing system of claim 8, wherein the personal surrogate computer program runs continuously and receives one or more electronic messages comprised of a target.

10. The computing system of claim 1, wherein the personalized data stream analysis module is further configured to implement:
    programs that consolidate and analyze data gathered by battle applications;
    a variance monitoring program that detects variance condition in data based on parameters established by the user; and a communication program that provides visual status indicators to end user local devices.

11. The computing system of claim 10, wherein the personalized data stream analysis module is further configured to implement a scoring engine including an analysis maintenance program within the scoring engine, wherein the scoring engine creates a visual interface within a web browser that allows an administrator to set up run time intervals, trigger values, user weapon and communication defaults, mathematical ranges for other programs that are specific to the system, electronic communication message templates, and other attributes required by the scoring application.

12. The computing system of claim 11, wherein a process workflow queue program within the scoring engine is configured to continuously control the execution of computer scoring programs included within the scoring engine based on at least one of run-time intervals and measurement of attribute values within stored raw data records, the attribute values including record counts and data item value thresholds.

13. The computing system of claim 10, wherein the scoring engine and analysis program is configured to receive an electronic run message from the process workflow queue program comprising a user-id and date-time-stamp value.

14. A method of intelligence gathering and analysis, the method comprising:
  instantiating execution, on a remote computer, of an avatar rendering and maintenance module stored in memory of the remote computer, the avatar rendering and maintenance module configured to provide an indicator for users to select targeted data streams presented as weapon icons that includes user-selected analysis priorities and threshold attributes of the targeted data;
  instantiating execution, on the remote computer, of a self-directed data gathering and communication module stored in memory of the remote computer, the self-directed data gathering and communication module configured to provide administration programs that coordinate and control timing and execution of commercially available web search, crawler, and messaging applications;
  instantiating execution, on the remote computer, of a personalized data stream analysis module stored in memory of the remote computer, the personalized data stream analysis module configured to provide administration programs that coordinate and control timing and execution of data consolidation, workflow and scoring programs related to the analysis module; and
  configuring a database accessible by the remote computer to store and manage electronic data related to administrative control of all other system applications and to hold all user gathered data and analysis records as defined specific to the system requirements.

15. The method of claim 14, further comprising:
  specifying, via the avatar rendering and maintenance module, electronic communication interfaces presented as tool icons;
  installing, via the avatar rendering and maintenance module, an active watcher monitoring component on a plurality of local user devices; and
  enabling, via the avatar rendering and maintenance module, web-service based data interaction.

16. The method of claim 14, further comprising implementing:
  programs, via the data gathering and communication module, configured as personal electronic surrogates to enable the search, crawling and messaging applications to gain secure access to targeted sources that require specific user credentials;
  programs, via the data gathering and communication module, that enable the continuous multi-server operation of battle applications; and
  programs, via the data gathering and communication module, that enable high-volume web-service based data interaction with other applications of the system.

17. The method of claim 14, further comprising implementing:
  programs, via the personalized data stream analysis module, that consolidate and analyze data gathered by battle applications;
  a variance monitoring program, via the personalized data stream analysis module, that detects variance condition in the data based on parameters established by the user; and
  a communication program, via the personalized data stream analysis module, that provides visual status indicators to end user local devices.

18. A method for self-directed filtered electronic data gathering and automated delivery and presentation of analytical data to users via interaction with a computer generated avatar, wherein said data is contained in a computer database that holds gathered data as augmented by a trend analysis computer program, the method comprising:
  instantiating a plurality of remote computer-based applications at one or more remote computing systems, the plurality of remote computer-based applications comprising an avatar maintenance module, a data gathering module, a data scoring engine module, a data storage module, and a data interaction module, wherein the avatar maintenance module comprises an avatar graphical report program, an avatar builder program, a weapon selection program, a communicator select program, and a watcher install program;
  receiving a communication from a user initiated web browser session at a remote front-end web server via a local computer device executing a browser, the remote front-end web server included within the one or more remote computing systems;
  prompting the user via the watcher install program to create a login with a user-id and password, wherein a local status watcher communication application is downloaded and installed at the local computer device via a secure internet communication session;
  saving user account information and executing the avatar builder program using the one or more remote computing systems to present the user with choices to select avatar graphical attributes via a second browser session;
  receiving from the user a selection of weapons monitoring targets and preferred communication modes; and
  receiving selection of an activate button within the avatar builder interface to run the avatar activate program that sends an electronic message containing the user-id and a status code to a battle application, wherein the battle application schedules gatherers comprising at least one data source query tools that begins collecting data using the plurality of remote computer-based applications at the one or more remote computing systems on behalf of the user.

19. The method of claim 18, wherein the scoring engine application simultaneously and continuously loops through gathered battle data, identifies new data, groups the data by weapon and applies a velocity static scoring and a net change algorithm to the data with resulting score and change records.

20. The method of claim 19, wherein a velocity variance check program running continuously in the scoring engine application compares static and trend scores to user entered values established for each weapon, and wherein upon a resulting comparison falling beyond a mathematical range expressed by a power attribute for user chosen weapons, the variance check program sends an electronic message to the messenger alert program, consisting of user-id, weapon and a predetermined alert body.

* * * * *